Jan. 6, 1953     F. H. GOODING     2,624,794
ELECTRIC POWER CABLE WITH CARRIER COUPLING
Filed July 8, 1950     2 SHEETS—SHEET 1
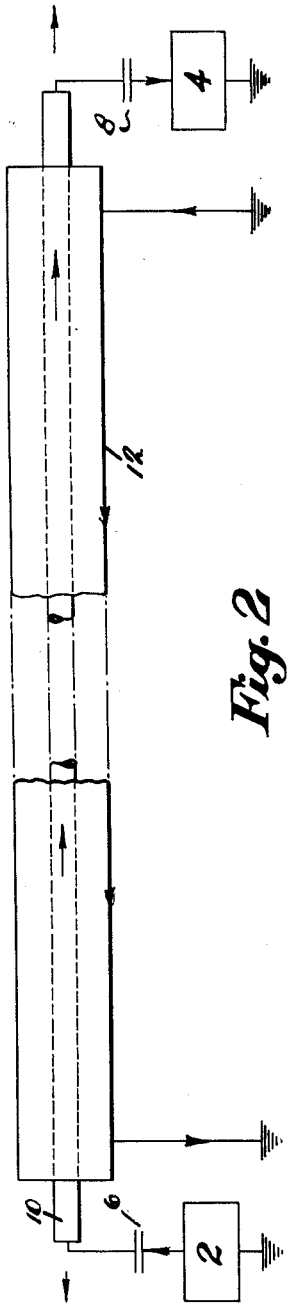
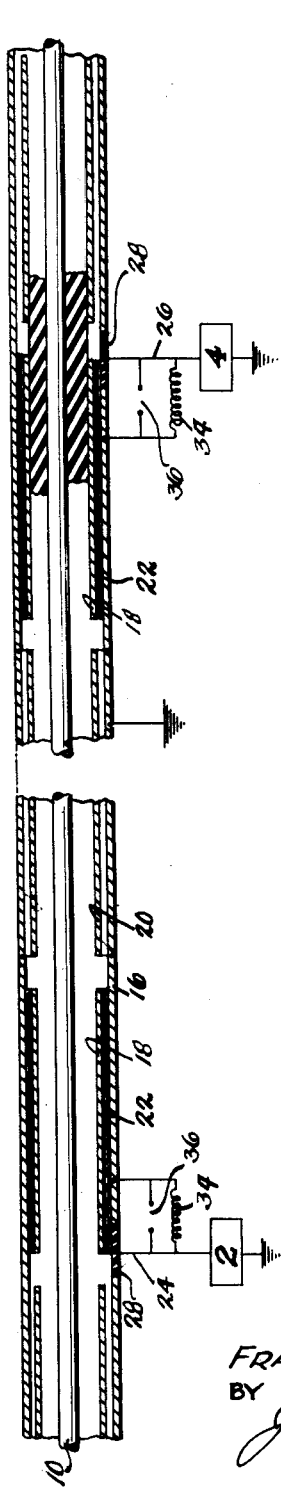
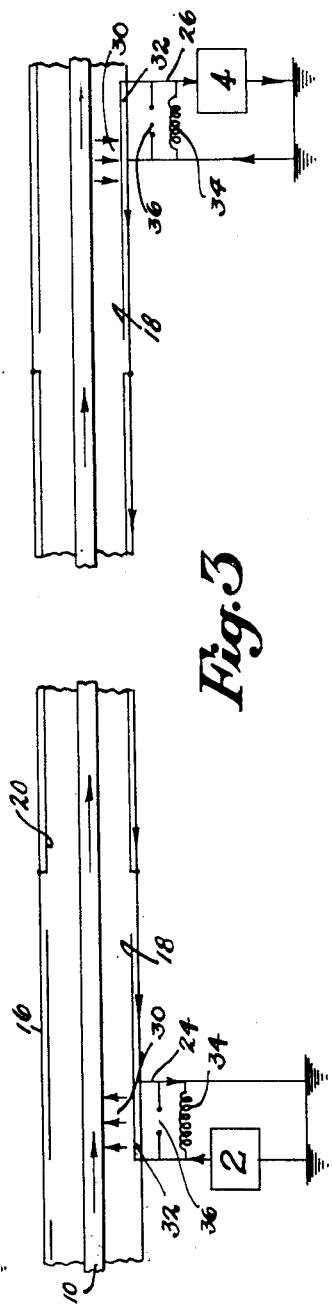
INVENTOR
FRANCIS H. GOODING
BY James G. Bethell
ATTORNEY Jan. 6, 1953    F. H. GOODING    2,624,794
ELECTRIC POWER CABLE WITH CARRIER COUPLING
Filed July 8, 1950    2 SHEETS—SHEET 2
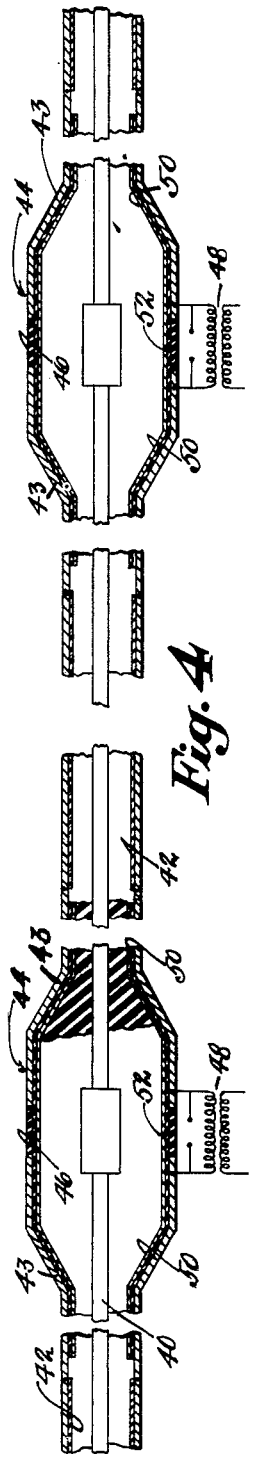
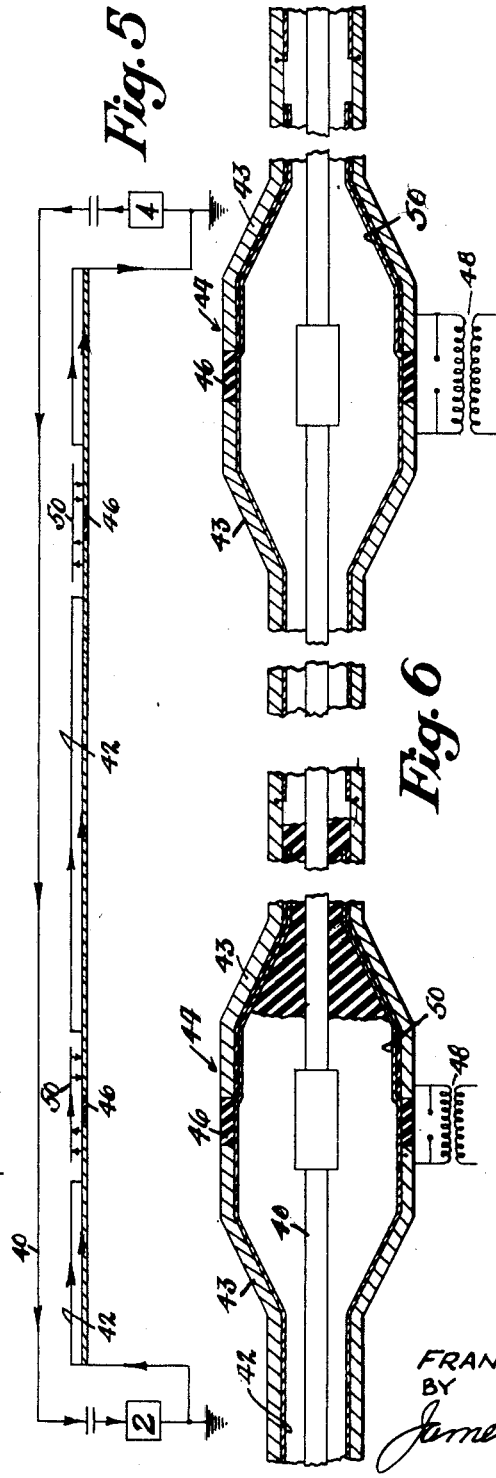
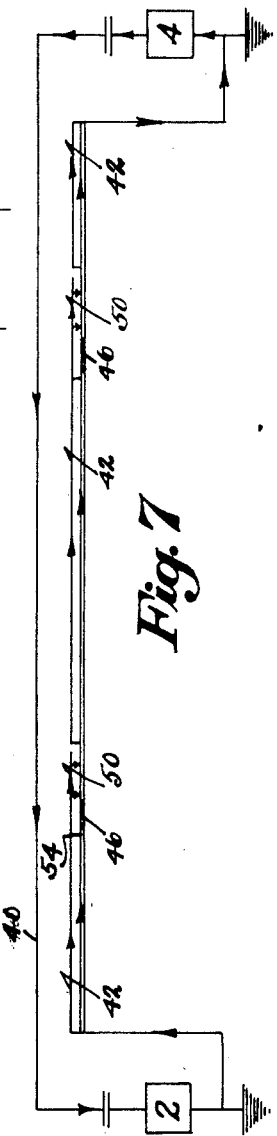
INVENTOR
FRANCIS H. GOODING
BY
James G. Bethell
ATTORNEY Patented Jan. 6, 1953

2,624,794

UNITED STATES PATENT OFFICE 2,624,794

ELECTRIC POWER CABLE WITH CARRIER COUPLING

Francis H. Gooding, Lodi, N. J., assignor to The Okonite Company, Passaic, N. J., a corporation of New Jersey Application July 8, 1950, Serial No. 172,766

4 Claims. (Cl. 177—352)

This invention is directed to an improvement in electric power cables when used for transmitting carrier currents, wherein, in leaded cables and in cables of the type in which the conductors are enclosed in a pipe line, external condensers are eliminated and replaced by condensers built into the steel pipe or leaded cable; and wherein, with respect to leaded cables, reduction is effected in loss due to sheath bonding transformers.

Fig. 1 of the accompanying drawings is a fragmentary view of a power line illustrating the conventional arrangement of carrier current circuit.

Figs. 2 and 3 are fragmentary views illustrating a construction in which a section of the cable itself is used as the coupling condenser.

Figs. 4 and 5 are fragmentary views illustrating another embodiment of the invention.

Figs. 6 and 7 are fragmentary views illustrating a modification of the construction illustrated in Figs. 4 and 5.

Normally, the carrier current circuit is arranged as in Fig. 1 of the drawings, wherein 2 and 4 represent equipment for sending and receiving modulated carrier currents, and 6 and 8 designate condensers of about 2000 micromicrofarads, insulated for the same high voltage as used on the cable conductor 10. When a signal is sent out from equipment 2, it passes through condenser 6, along conductor 10, and, after passing through condenser 8 and equipment 4, the signal returns along the shielding tapes, armor, pipe, and associated grounds, this return path being represented in Fig. 1 by tube designated 12.

The losses incident to such construction impose a severe limitation on the distance over which carrier currents may be transmitted, especially when considerable lengths of power cable are included in the circuit.

In accordance with my invention, when the carrier equipment has to be coupled to a power cable, a section of the cable itself may be used as the coupling condenser, as I have illustrated in Figs. 2 and 3.

In these illustrations, 10 designates an insulated power cable conductor, which, as is usual, is equipped with metallic shielding tape. The conductor is shown as installed in a steel pipe 16. For clarity, only one conductor has been shown in the drawings, although two or more conductors would normally be installed in the pipe 16 for commercial frequency power transmission. Instead of the shielding tape being in a continuous length, as is customary, sections 18 are isolated from the remainder 20, and these isolated sections 18 are lightly insulated from the steel pipe by wrapping layers of insulating tape 22, for example, about them, the remainder 20 of the shielding tape being in electrical contact with the pipe.

Electrical connections are made between isolated shield sections 18 and sending and receiving equipment 2 and 4 by bringing out leads 24 and 26 through insulating means 28, provided for this purpose in the wall of the pipe line 16.

The path of the carrier current is illustrated best in Fig. 3, where 30 designates the coupling capacitance between isolated shield sections 18 and the power cable conductor 10. There also exists a capacitance 32 between the isolated shield sections 18 and the pipe 16. This will have a value which may be greater, for example, twenty times as great as capacitance 30, and some of the returning carrier current may be shunted to ground through this capacitance instead of passing through the carrier equipment.

To obviate this, inductances 34 may be connected in parallel with capacitances 32, so as to resonate with them and impose a high impedance path to the carrier current. The inductances 34 are constructed so as to have low impedance to commercial frequency currents, for example 60-cycle currents, and, so far as commercial frequency currents are concerned, the sheath sections 18 will be practically at ground potential.

A protective spark gap 35 (Fig. 2) may be connected in parallel with each of the inductances 34 and capacitances 30, which will have a lower impulse breakdown strength than the insulating tape 22 between the isolated shield sections 18 and the pipe 16. In case of a surge on the power line, the gap 36 will protect the insulation 22 and limit the induced voltage applied across the carrier current sending and receiving equipment.

It will be seen from the foregoing that my invention provides an electric power cable for the transmission of high-frequency carrier currents wherein sections of the shielding tape are isolated, to provide sufficient capacitance to transmit carrier currents to the cable conductor in an efficient manner, electrical connections being provided between the isolated sections and sending and carrying equipment external to the cable.

It will seen also that I provide inductance coils which are connected between the isolated sections of cable shielding and ground, these coils having such value that, when connected in parallel with the capacitance of the isolated shielding tape sections to ground, high impedance is offered to the carrier frequency current being used, but low impedance to the power frequency of the cable.

It will be seen also that, in combination with the inductance coils, I provide protective spark gaps, set so as to spark over at a lower voltage than the impulse breakdown value of the insulating tape between the isolated shielding tape sections and the ground.

My invention may be incorporated in jointed power cable installations equipped with sheath bonding transformers.

Referring to Fig. 4, I have there illustrated a short length of lead-sheathed power cable. The cable conductor is designated 40. It will be appreciated that the conductor is insulated, and, as is customary, shielding tape 42 is wrapped about the cable insulation. Cables of this construction are equipped at intervals with joints 44, the lead sheaths 43 of adjacent cable lengths at the joints being insulated from each other, as illustrated at 46. It is customary to equip such cables with sheath bonding transformers 48, connected across the insulation 46 of the metal sheaths 43. This construction is employed to reduce the flow of circulating currents along the cable sheaths, thus reducing sheath losses in lead-sheathed power cables.

This construction is unsatisfactory, however, when high-frequency carrier currents are to be transmitted, because the bonding transformers 48 introduce a high-loss path for the carrier currents. To adapt this construction for carrier currents, I employ isolated sections 50 of shielding tape, which are insulated from the cable sheath and from the remainder of the tape 42, the isolated sections of shielding tape being connected together in the joint, as indicated at 52, so that the two condensers thus formed between the cable sheath and the isolated shielding tape sections are joined in series, and the carrier currents now have a low-impedance path shunted across the winding of each of the transformers 48. It will be appreciated, however, that at the same time, the cable sheath sections at each side of each joint are still separated from each other, so far as the low-frequency currents are concerned.

The path of the carrier frequency currents is illustrated in Fig. 5.

Fig. 6 illustrates a modification of the construction illustrated in Fig. 4. In the construction of Fig. 6, the shielding tape is broken at one side only, instead of each side of the joint. As distinguished from Fig. 4, this section of the tape is grounded, as for example to the cable sheath, as shown at 54. With this construction, as in Fig. 4, there is no metallic connection across the insulated joint, except by way of the bonding transformer.

What I claim is:

1. An electric power cable for the transmission of carrier currents, said cable comprising, in combination, a power cable conductor; insulation therefor; an outer sheath, enclosing the insulated conductor; metal shielding tape, wrapped about the conductor insulation intermediate the sheath and insulation, the shielding tape being broken to provide two lengths of tape isolated from each other and from the remainder of the tape; and carrier current sending and receiving equipment, attached to each of said isolated lengths or sections of tape.

2. An electric power cable for the transmission of carrier currents, said cable comprising, in combination, a power cable conductor; insulation therefor; an outer metal pipe enclosing the insulated conductor; metal shielding tape wrapped about the conductor insulation, the shielding tape being broken to provide two lengths of tape isolated from each other and from the remainder of the tape; two sets of carrier current sending and receiving equipment outside of said pipe; a lead connected to each of said isolated shield sections; and insulating means in the wall of said pipe for each of said leads through which the lead is brought to the pipe exterior for attachment to the said sending and receiving equipment.

3. An electric power cable for the transmission of carrier currents, said cable comprising, in combination, a power cable conductor; insulation therefor; an outer enclosing metal pipe; metal shielding tape wrapped about the conductor insulation, the said tape being broken to provide two lengths of tape isolated from each other and from the remainder of the tape; insulation between said isolated lengths of tape and the wall of the pipe; and carrier current sending and receiving equipment attached to each of said isolated tape lengths or sections.

4. An electric power cable for the transmission of carrier currents, said cable comprising, in combination, a power cable conductor; insulation therefor; an outer enclosing metal pipe; metal shielding tape wrapped about the conductor insulation, the said tape being broken to provide two lengths of tape isolated from each other and from the remainder of the tape; two sets of carrier current sending and receiving equipment outside of said pipe; a lead from each of said isolated tape lengths or sections passing through the wall of said pipe and connected to said sending and receiving equipment; insulation for insulating said isolated tape lengths or sections from the pipe; and an inductance connected in parallel with the capacitances provided by the said insulating of the isolated tape lengths.

FRANCIS H. GOODING.

REFERENCES CITED

The following references are of record in the file of this patent:

UNITED STATES PATENTS

| Number | Name | Date |
|---|---|---|
| 1,547,242 | Strieby | July 28, 1925 |
| 1,727,387 | Zogbaum | Sept. 10, 1929 |